W. E. SCHWALM.
ATTACHMENT FOR PRINTING PRESSES.
APPLICATION FILED FEB. 19, 1908.

913,984.

Patented Mar. 2, 1909.

Inventor
Walter E. Schwalm.

Witnesses
John A. Harrison.
A. A. Harrison.

By M. E. Harrison.
Attorney

UNITED STATES PATENT OFFICE.

WALTER E. SCHWALM, OF PARNASSUS, PENNSYLVANIA.

ATTACHMENT FOR PRINTING-PRESSES.

No. 913,984.  Specification of Letters Patent.  Patented March 2, 1909.

Application filed February 19, 1908. Serial No. 416,691.

*To all whom it may concern:*

Be it known that I, WALTER E. SCHWALM, a citizen of the United States, residing at Parnassus, in the county of Westmoreland and State of Pennsylvania, have invented certain new and useful Improvements in Attachments for Printing-Presses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in printing presses, particularly to the class known as "crank-acting", wherein the connecting rod or rods extend across the jaws and connect the crank member with the movable jaw. Owing to the weight and delicate nature of the chase and attending set-up matter, it is an extremely difficult operation to place the same in position in the press, as it necessitates elevating the same, practically at arms length, sufficient to clear the connecting rod, great care being exercised to prevent coming in contact with any of the parts of the press to prevent displacement of any of the matter set-up therein, and as the said connecting rod is the only conveniently positioned member applicable as a temporary support preparatory to placing the same in position in the press, the possibilities of communicating a shock and consequent disturbance to the set-up matter, occasioned by the attending jar in contacting therewith, as well as the difficulty of slipping upon the inclined surface of the rod, such rod as a temporary support could not be made use of.

Therefore the object of my invention is to obviate the difficulties referred to, as will be hereinafter disclosed in the specification.

Figure 1:
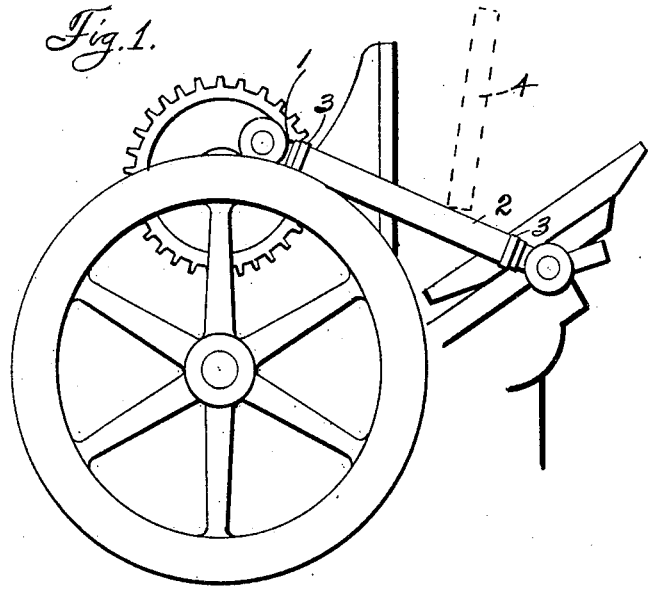
Figure 2:
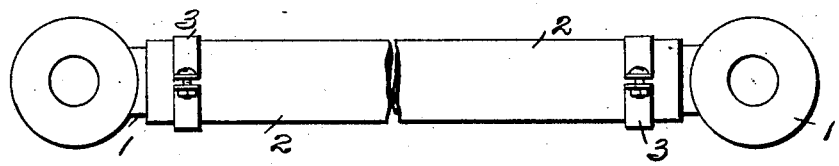
Figure 3:
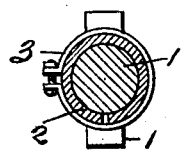

In the accompanying drawings forming a part of the specification, Figure 1, is a side elevation of my improved rod in operative relation with its attending parts of the press. Fig. 2, is a longitudinal side view of the rod disconnected from the press and enlarged, and Fig. 3, is a transverse sectional view of the same, similar reference characters in said views designating like detail parts.

The invention consists of providing a connecting rod 1, the surface of which offers resistance to slipping and shock to the chase in contacting therewith, which I accomplish by applying and securing thereto a coating of rubber or other material possessing like qualities, which for convenience of application I prefer be made of a rubber tube 2, split longitudinally, or otherwise, and secured in position upon the rod by means of suitable clamps 3, preferably of the form shown. Said longitudinal split is preferably provided upon any other side of the tube than the top thereof, allowing the top to have an uninterrupted surface of rubber. The clamping members shown in the drawings comprise metallic split rings having connecting screws provided for their adjacent ends. By thus applying a covering of such material to the rod the chase 4 may be temporarily rested thereupon (as shown at Fig. 1.) preparatory to placing in the press, without the dangers heretofore attending the same as previously set forth.

Having thus fully shown and described my invention, what I claim is:

1. In a printing press, a connecting rod between the movable jaw and crank member, a lengthwise split covering of rubber arranged on said connecting rod, and clamping members surrounding the same.

2. A temporary support for a chase comprising in combination with a connecting rod between the movable jaw and crank member of a printing press, of a rubber covering upon said connecting rod, said covering longitudinally split along the underneath side of the rod, and clamping members surrounding the covering and rod.

3. In a printing press, a temporary support for a chase comprising in combination with the connecting rod of the press, of a strip of rubber surrounding said rod and split longitudinally at a point other than the upper surface of the rod, a plurality of split coils surrounding said rubber covering and having their ends secured together by adjustable screws.

In testimony whereof, I affix my signature, in presence of two witnesses.

WALTER E. SCHWALM.

Witnesses:
E. J. BAXTER,
JOHN A. HARRISON.